(12) United States Patent
Blumrich et al.

(10) Patent No.: US 7,457,303 B2
(45) Date of Patent: Nov. 25, 2008

(54) ONE-BOUNCE NETWORK (75) Inventors: Matthias A. Blumrich, Ridgefield, CT (US); Dong Chen, Croton on Hudson, NY (US); Alan G. Gara, Mount Kisco, NY (US); Mark E. Giampapa, Irvington, NY (US); Philip Heidelberger, Cortlandt Manor, NY (US); Burkhard D. Steinmacher-Burow, Mount Kisco, NY (US); Pavlos M. Vranas, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 10/675,129

(22) Filed: Sep. 30, 2003

(65) Prior Publication Data
US 2005/0002387 A1 Jan. 6, 2005

Related U.S. Application Data (60) Provisional application No. 60/476,509, filed on Jun. 6, 2003.

(51) Int. Cl.
*H04L 12/28* (2006.01)
(52) U.S. Cl. ........................ 370/406; 370/407
(58) Field of Classification Search ................. 370/254
See application file for complete search history.

(56) References Cited

U.S. PATENT DOCUMENTS

| | | | | |
|---|---|---|---|---|
| 5,535,195 A * | 7/1996 | Lee | ............................. | 370/256 |
| 5,592,476 A * | 1/1997 | Calamvokis et al. | ........ | 370/390 |
| 5,963,554 A * | 10/1999 | Song | ....................... | 370/395.1 |
| 6,101,181 A * | 8/2000 | Passint et al. | ............... | 370/352 |
| 6,285,679 B1 * | 9/2001 | Dally et al. | .................. | 370/413 |
| 6,292,822 B1 * | 9/2001 | Hardwick | .................... | 718/105 |
| 6,335,930 B1 * | 1/2002 | Lee | ............................ | 370/387 |
| 6,813,643 B2 * | 11/2004 | Perlman | ...................... | 709/232 |
| 7,058,084 B2 * | 6/2006 | McMillen et al. | ........... | 370/473 |
| 7,065,040 B2 * | 6/2006 | Nagamine | ................... | 370/223 |
| 7,173,912 B2 * | 2/2007 | Jaber et al. | .................. | 370/254 |
| 7,185,077 B1 * | 2/2007 | O'Toole et al. | ............. | 709/223 |
| 7,187,652 B2 * | 3/2007 | Lee et al. | ..................... | 370/238 |
| 7,187,679 B2 * | 3/2007 | Dally et al. | .................. | 370/400 |
| 7,194,517 B2 * | 3/2007 | Conway et al. | ............. | 709/212 |
| 2002/0051427 A1 * | 5/2002 | Carvey | ....................... | 370/254 |

(Continued)

OTHER PUBLICATIONS

Dror Feitelson, Parallel Computing Systems, Part 2: Networks and Routing, 2002.*

(Continued)

*Primary Examiner*—Chau Nguyen
*Assistant Examiner*—Eunsook Choi
(74) *Attorney, Agent, or Firm*—Scully, Scott, Murphy & Presser, P.C.; Daniel P. Morris, Esq.

(57) ABSTRACT

A one-bounce data network comprises a plurality of nodes interconnected to each other via communication links, the network including a plurality of interconnected switch devices, said switch devices interconnected such that a message is communicated between any two switches passes over a single link from a source switch to a destination switch; and, the source switch concurrently sends a message to an arbitrary bounce switch which then sends the message to the destination switch.

37 Claims, 9 Drawing Sheets

U.S. PATENT DOCUMENTS

| | | | | |
|---|---|---|---|---|
| 2002/0103924 | A1* | 8/2002 | Nomura | 709/235 |
| 2002/0131409 | A1* | 9/2002 | Frank et al. | 370/386 |
| 2002/0181395 | A1* | 12/2002 | Foster et al. | 370/229 |
| 2003/0031127 | A1* | 2/2003 | Saleh et al. | 370/228 |
| 2003/0076829 | A1* | 4/2003 | Rabie et al. | 370/391 |
| 2003/0076833 | A1* | 4/2003 | Shin et al. | 370/395.1 |
| 2003/0153338 | A1* | 8/2003 | Herz et al. | 455/517 |
| 2005/0090273 | A1* | 4/2005 | Jin et al. | 455/502 |
| 2005/0163127 | A1* | 7/2005 | Choi et al. | 370/395.4 |

OTHER PUBLICATIONS

Bandwidth-Optimal Complete Exchange on Wormhole-Routed 2D/3D Torus Networks, IEEE vol. 8, No. 4, Apr. 1987.*

SP2 High-Performance Switch Architecture, 1994.*

Stunkel, et al., "The SP2 High-Performance Switch", IBM Systems Journal, vol. 34 No. 2, 1995, pp. 185-204.

* cited by examiner

ONE-BOUNCE NETWORK

CROSS REFERENCE TO RELATED APPLICATIONS

This application relates to and claims the benefit of commonly owned, co-pending U.S. Provisional Patent Application No. 60/476,509 filed Jun. 6, 2003, the whole contents and subject matter of which is incorporated by reference as if fully set forth herein.

BACKGROUND OF THE INVENTION

1. Field of the Invention

The present invention relates to the field of message-passing data networks. For example, such a network is used in a distributed-memory message-passing parallel computer, as applied for example, to high performance computation.

2. Description of the Prior Art

A message-passing data network serves to pass messages between users of the network, referred to herein as "nodes." Each node can perform operations independent of the other nodes. Nodes can act in concert by passing messages between each other over the network. An example of such a network is that of a distributed-memory parallel computer. Each of its nodes has one or more processors that operate on local memory. An application using multiple nodes of such a computer coordinates their actions by passing messages between them.

A message-passing data network consists of switches and links. A link merely passes data between two switches. Unless stated otherwise, a link is bi-directional. In other words, a link supports messages in either direction between the two switches. A switch routes incoming data from a node or link to another node or link. A switch may be connected to an arbitrary number of nodes and links. Depending on the network and on the nodes' location in the network, a message between two nodes may need to cross several switches and links. In general, the fewer the number of such crossings required, the more efficient the network. The efficiency has two aspects. Firstly, the fewer the number of such crossings, the shorter the latency or time required for a message to pass from its source to its destination. Secondly, the fewer the number of such crossings, the greater the effective bandwidth of the network.

Networks to date efficiently support some communication patterns, but not all patterns. For example, a three dimensional (3D) torus network efficiently supports 3D nearest neighbor communication. By construction, each switch is linked to its neighbors, so for nearest neighbor communication, each message crosses only a single link. Efficient support of nearest-neighbor communication is required in various situations, including many numerical algorithms executing on a distributed-memory parallel computer. In contrast, the 3D torus does not efficiently support communication to a randomly chosen node. On average such a message crosses one quarter of the links in each dimension. So on an N*N*N dimensional torus, a message to a random destination crosses N*¾ links. Efficient support of communication to a randomly chosen node is required in various situations, including the all-to-all communication pattern used in many numerical algorithms executing on a distributed-memory parallel computer. The problem is to create a network which efficiently supports various communication patterns, including nearest-neighbor and all-to-all.

In general at a given bandwidth, an external link between switches costs more than a link within a switch. Thus, a further problem is to create a network which efficiently uses the external links between switches, even if this introduces inefficiencies in the use of links internal to a switch.

It would thus be highly desirable to provide a network architecture that efficiently supports various communication patterns, including nearest-neighbor and all-to-all and further, makes efficient use of external links between switches.

SUMMARY OF THE INVENTION

It is thus an object of the present invention to provide a one-bounce network architecture and method of communicating that efficiently supports various communication patterns, including nearest-neighbor and all-to-all.

It is another object of the present invention to provide a one-bounce network architecture and method of communicating that makes efficient use of external links connecting switches of said network.

Preferably, the one-bounce network efficiently supports various communication patterns, including nearest-neighbor and all-to-all. In a one-bounce network, each switch is linked to every other switch. A message between any two switches thus passes over just a single link from the source switch to the destination switch. In addition, the source switch may concurrently send a message to an arbitrary other switch which then sends the message onwards to the destination switch, i.e., one-bounce message passing.

Furthermore, the one-bounce network efficiently uses the external links between switches, though sometimes with the tradeoff of less efficient use of links internal to a switch.

Advantageously, the embodiments of the invention may be applied for performing complex computations in the various technical disciplines including the field of life sciences.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
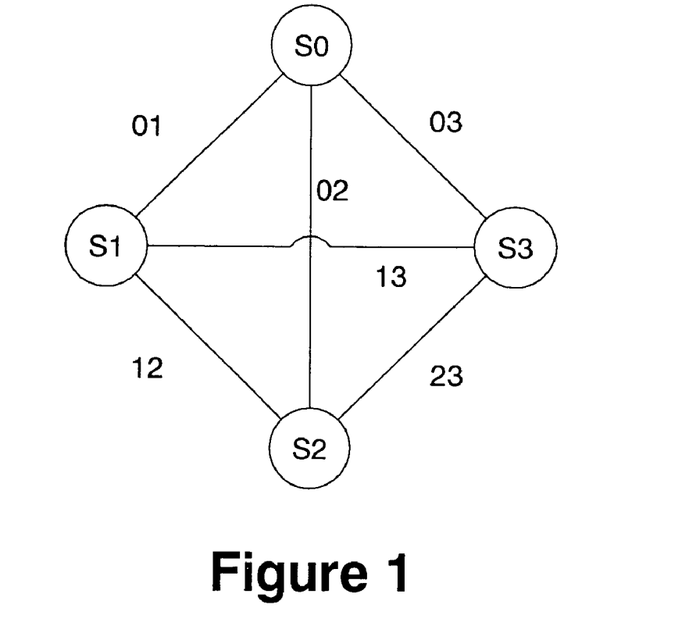
FIG. 1 illustrates an exemplary one bounce network that includes 4 switches interconnected via a link between each pair of switches according to one embodiment of the present invention.
Figure 2:
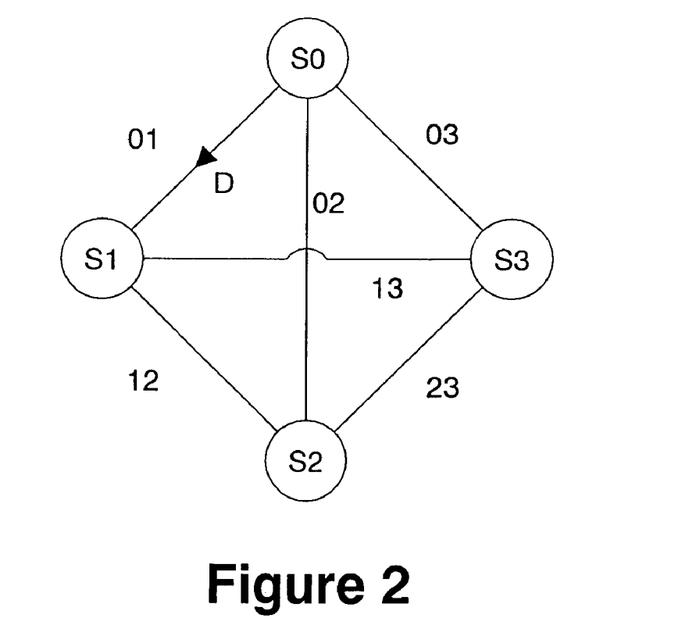
FIG. 2 uses the exemplary one bounce network of FIG. 1 to illustrate a message passing directly between 2 switches.

The basic principle of this invention is the provisions of a one-bounce network that efficiently supports various communication patterns, including nearest-neighbor and all-to-all. In a one-bounce network, each switch is linked to every other switch. FIG. 1 illustrates an example network of 4 switches labeled S0-S3. As shown in the network depicted in FIG. 1 each switch, e.g., S0, is interconnected by links, e.g., labeled 01, 02, 03 to respective other switches, e.g., S1, S2, S3. In this configuration, any message between any two switches passes over just a single link. FIG. 2 illustrates this concept as shown by the arrow D depicting an example message, e.g., data, communicated from a source switch S0 to destination switch S1 over a single link 01 in the one-bounce network of FIG. 1. While the one-bounce network may be a circuit-switched or packet-based network, it is assumed for purposes of description that the one-bounce network is a packet-based network.

Figure 3:
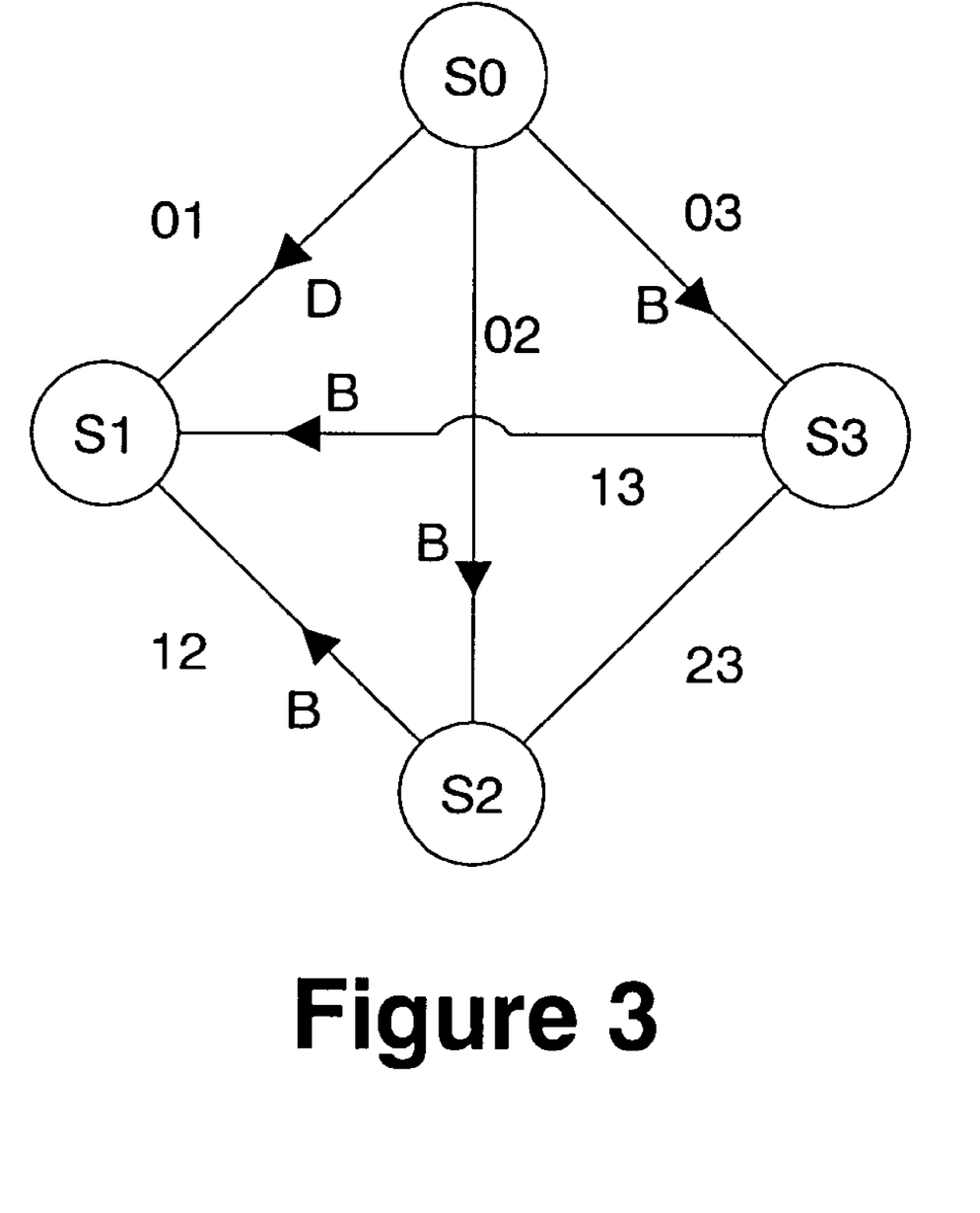
FIG. 3 uses the exemplary one bounce network of FIG. 2 to illustrate bounce messages passing between 2 switches. The messages from switch S0 pass to switch S1 via the switch S2 or the switch S3.

Using the link between two switches is efficient for a single small message. However, using just the link between two switches is not efficient for many other communication patterns. An example of this inefficiency is the simultaneous communication of many messages between the two switches. If just the link between the two switches is used, then the simultaneous messages are communicated at the bandwidth of the single link. All the other links exiting the source switch and all the other links entering the destination switch are idle. The solution to this inefficiency is to allow the source switch to send a message to an arbitrary other switch which then sends the message onwards to the destination switch, i.e., the message is communicated in one-bounce. FIG. 3 adds this bounce traffic to the situation illustrated in FIG. 2 as shown by the arrow D representing the first message communicated from switch S0 to switch S1 as described with respect to FIG. 2 and the concurrent communication of a second message to destination switch S1 over one of switches S2 or S3 over a one bounce path labeled arrow B in FIG. 3.

In the one-bounce network configured with switches as depicted in FIG. 3, there is enabled simultaneous communication of many messages between any two switches, the one-bounce allows all the links exiting the source switch and the links entering the destination switch to be used. Thus, the simultaneous messages are communicated at the aggregate bandwidth of all the links to or from a switch. This one-bounce network configuration efficiently supports various communication patterns, including nearest-neighbor and all-to-all where, by construction, each switch is linked to every other switch so that each message crosses only a single link.

As described above, the one-bounce switch allows two switches to communicate at the aggregate bandwidth of all the links to or from a switch. If all the switches in the network are paired and simultaneously communicate, then in the reasonable worst case each pair communicates at half the aggregate bandwidth of all the links from a switch. At each switch, the other half of the bandwidth serves the bounce traffic of the other pairs of switches. This generalizes from simultaneous communication among a pair of switches to larger groups of switches. Going from small groups to large groups, the effective bandwidth from each switch increases from half up to all the aggregate bandwidth of all the links from the switch. As the group size increases, more traffic uses the more efficient bounce-free path and less traffic uses the less efficient bounce path. The largest possible group contains all the switches of the network and is the all-to-all communication described above.

The one-bounce network logically can be considered as a variety of networks. For example, a one bounce network consisting of 8 switches can be considered as a 8-element 1D torus or as a 2*4-element 2D torus or as a 2*2*2-element 3D torus. For a 1D torus, simultaneous communication from each switch to its two neighbors occurs at half the aggregate bandwidth of all the links to or from a switch. For a 3D torus, simultaneous communication from each switch to its six neighbors occurs at half the aggregate bandwidth of all the links to or from a switch. The one-bounce network thus efficiently supports nearest-neighbor communication.

The one-bounce network allows efficient physical scaling. In other words, the same switch can be used to construct networks with various numbers of switches. If the number of links to a switch is (L-1), then L is the number of switches in the largest network. In the largest network, each switch is connected to each other switch by a single link. In a smaller network, each switch is connected to each other switch by multiple links. For example, in a network consisting of L/2 switches, each switch is connected to each other switch by a two links. At each of the L/2 switches, the remaining link connects the switch to itself and thus increases the internal bandwidth of the switch. Similarly, in a network consisting of a single switch, all (L-1) links connect the switch to itself and thus increase the internal bandwidth of the switch.

The one-bounce network allows efficient space-partitioning of the network and of the nodes and other resources attached to the network. In other words, the nodes attached to a given switch or number of switches can be efficiently dedicated to a particular application. Thus, the one-bounce network allows the simultaneous execution of multiple applications with variety in the number of applications and variety in the number of nodes and switches used by any one application. The efficiency has at two main aspects. The first aspect is that the application communication between from one of its switches to the other switches of the application is in the reasonable worst case half the aggregate bandwidth of all the links of a switch. In the reasonable worst case, the other half of the bandwidth serves the bounce traffic of the other applications in the network. The second aspect of the efficiency is that all switches are equal in the one-bounce network. There is no notion of neighboring switches. Thus an application which executes on S switches can execute on any S switches in the network with equal application performance. A contrasting example is a torus network, where maximum performance requires an application to execute on neighboring nodes.

The one-bounce network efficiently supports unicast messages as well as multicast messages and reduction messages. A unicast message has a single source switch and a single destination switch. A multicast message has a single source switch and one or more destination switches. Since each switch in a one-bounce network is connected to each other switch, any switch can be the source of a multicast message to the other switches. In this simple implementation of multicast, the latency is just the time required to cross a single link.

The bandwidth is at least that of a single link. A reduction message has one or more source switches and a single destination switch. The corresponding operands in the payloads of the multiple sources are combined using operations such as arithmetic PLUS or logical AND. Since each switch in a one-bounce network is connected to each other switch, any switch can be the destination of a reduction message from the other switches. In this simple implementation of reduction, the latency is just the time required to cross a single link. The bandwidth is at least that of a single link. These simple implementations of multicast and reduction assume that the internals of the switch are able to perform the required internal multicasts and reductions. The simple implementations are feasible under the efficient space-partitioning as described.

In a packet-based one-bounce network, the restriction of one-bounce can be obeyed by a bit in each packet header indicating whether a packet has already bounced or not. This so-called bounce bit is clear when the packet is injected into the network and is set when the packet is bounced to a switch which is not the destination switch. At this so-called bounce switch, the set bounce bit indicates that the packet only can go to the destination switch.

In addition to restricting a packet to a single bounce, the bounce bit serves additional purposes. Firstly, by setting the bounce bit before injecting a packet into the network, the bounce bit allows a node to inject a packet guaranteed not to bounce. For example, for an application using all the nodes on a network, the most efficient all-to-all communication is achieved when no packet bounces and instead all packets proceed directly to the destination switch. In the second additional purpose, the node can specify the particular bounce switch to be used. The node sets in the packet header the bounce bit and the direct router identifier described below. If the direct router is not the router of the destination node, the packet is bounced over the external link of the identified direct router.

The one-bounce network may be referred to as deadlock-free as will now be described. The one-bounce network comprises switches, each switch having three independent channels or virtual channels. Each channel is assumed free of deadlock for traffic internal to the switch. The 3 channels are used in concert to provide a single deadlock-free channel across the switches and thus throughout the entire one-bounce network. The 3 channels are referred to as and include: 1) an injection channel, 2) a bounce channel and, 3) a destination channel. Consider a packet traveling on the deadlock-free channel of the one-bounce network. The packet is injected from a node into the injection channel and remains in that channel while in the injection switch. If the packet is bounced to another switch, it is moved to the bounce channel while in the bounce switch. When the packet arrives at the destination switch, it is moved to the destination channel while in the destination switch. The deadlock-free guarantee of the one-bounce network works as follows. The underlying network guarantees the destination channel to be deadlock free. So the destination channel is guaranteed to drain if the nodes are reading their received packets. Since a destination channel is the immediate destination of every packet in a bounce channel, the bounce channel is guaranteed to drain. Since a bounce channel is the immediate destination of every packet in an injection channel, the injection channel is guaranteed to drain. As in existing networks, the deadlock-free channel of the one-bounce network may be used in combination with other networks. For example, the deadlock-free channel can be used as an escape channel for additional channels that on their own are not free of deadlock.

The above deadlock-free channel does not provide in order delivery for multiple packets. However, the one-bounce network may provide such a channel that guarantees that packets arrive at their destination in the same order they were injected. A particular method is described here. By setting the bounce bit before injecting a packet into the network, the node injects packets guaranteed not to bounce. As described above, a packet travels on an injection channel in the injection switch and travels on a destination channel on the destination switch. If delivery is in order within such a channel, then the delivery is in order across the bounce network.

The remaining paragraphs provide example implementations of the internal details of the switches making up the one-bounce network.

A switch consists of routers and internal links and external links. An internal link is between two routers within the switch. The external links are the links described above between switches. In other words, an external link is between two routers in two different switches. A router routes incoming data from a node or link to another node or link. A router may be connected to an arbitrary number of nodes and links. Using only the internal links, not the external links, the routers within a switch are assumed to be a connected network. Within a switch, depending on the number of external links, the number of routers and the assignment of external links to routers, a router may have zero, one or more external links.

Within a given switch, the internal links may have differing bandwidths. Within a given network, the external links may have different bandwidths. With a given network, the external links may have different bandwidths than those of the internal links. For some configurations of the one bounce network, such different bandwidths are required to match the aggregate performance of the internal and external links.

Figure 4:
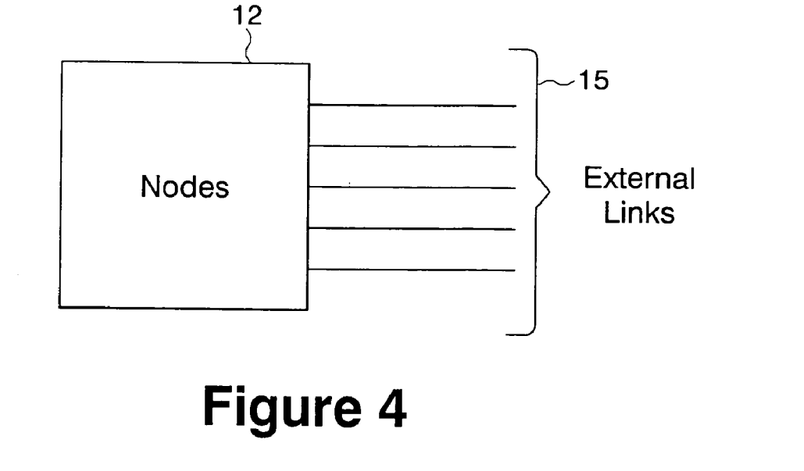
FIG. 4 illustrates an exemplary integrated switch in which the same internal routers serving the external links also serve the nodes of the switch.
Figure 5:
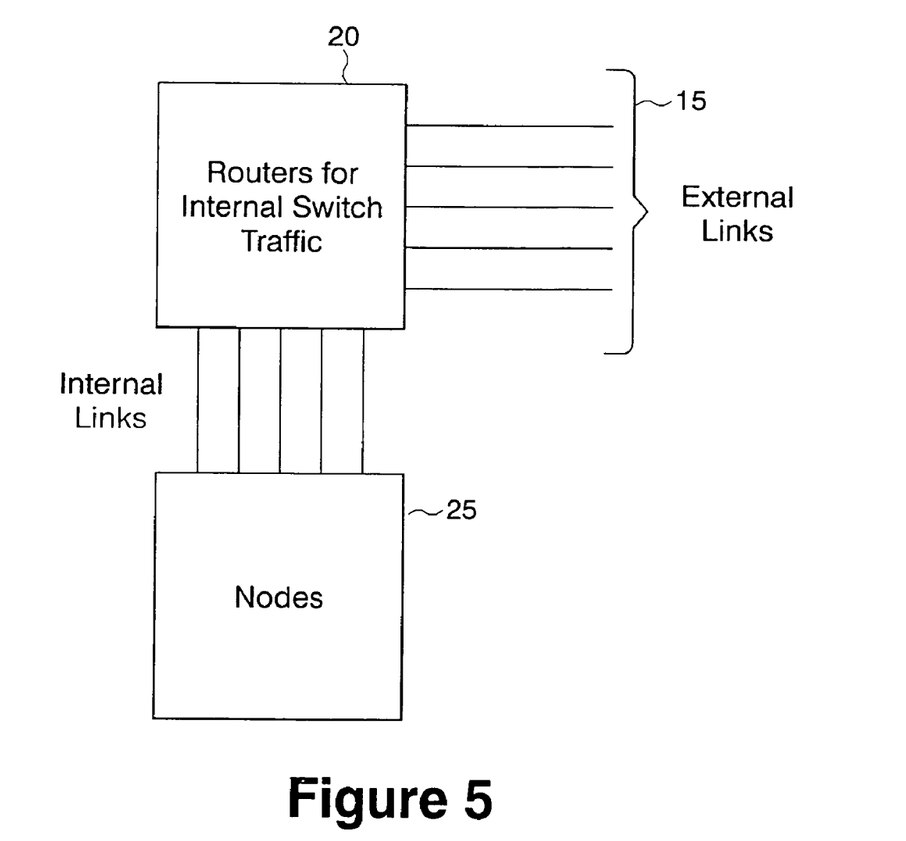
FIG. 5 illustrates an exemplary two-part switch in which a group of internal routers serve the external links and a separate group of routers serve the nodes of the switch.

As shown in FIG. 4, a switch may be integrated in the sense that the same internal routers serving the external links 15 also serve the nodes of the switch. FIG. 4 illustrates conceptually an integrated switch 12 for a one-bounce network. In contrast, FIG. 5 illustrates the two-part switch 20, 25 for a one-bounce network. As shown in FIG. 5, a two-part switch 20,25 has a group of internal routers 20 serving the external links 15 and a separate group of routers 25 serving the nodes within that portion of switch 25.

Figure 6:
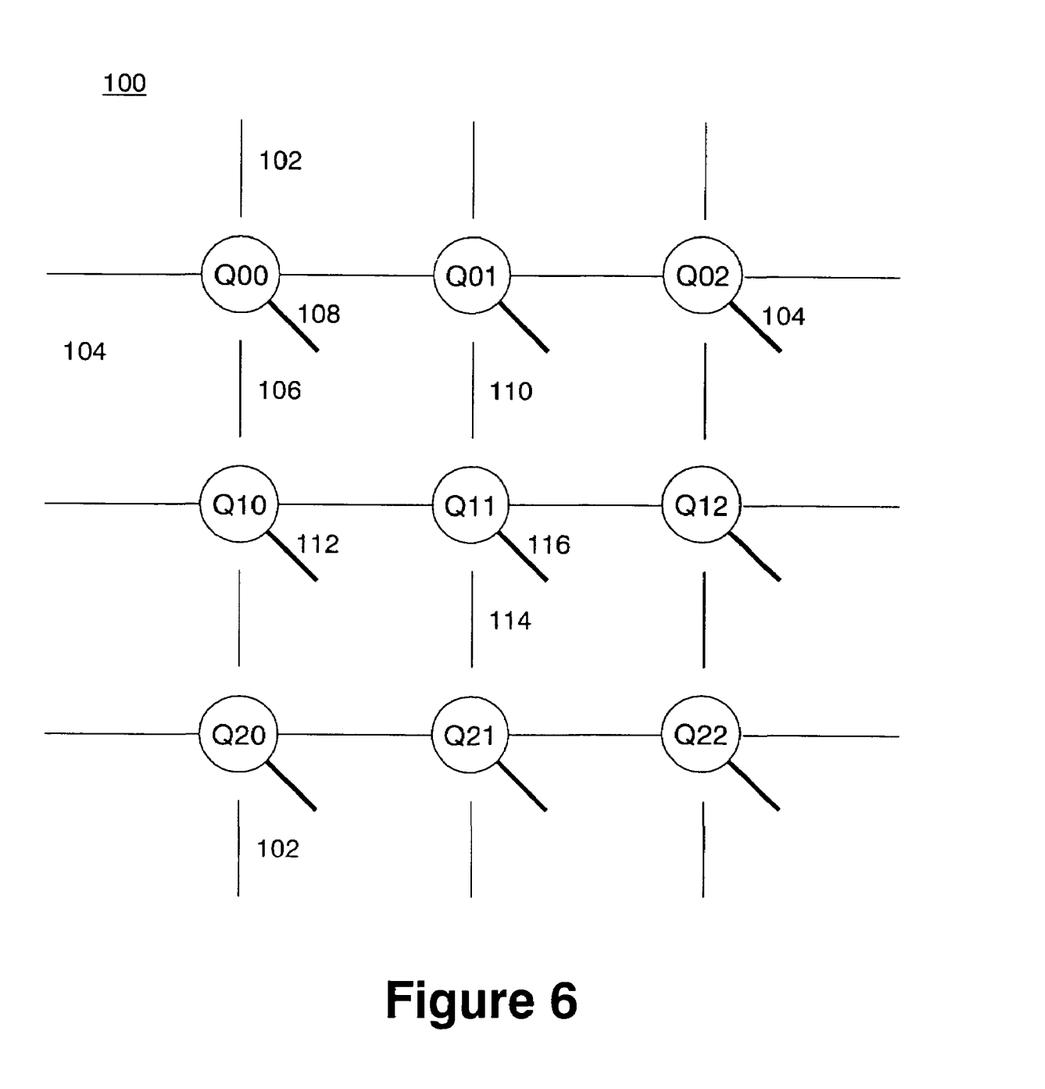
FIG. 6 illustrates an exemplary switch element that includes nine (9) nodes interconnected via a multidimensional grid utilizing an internal 2-dimensional 3×3 Torus network according to the present invention.
Figure 7:
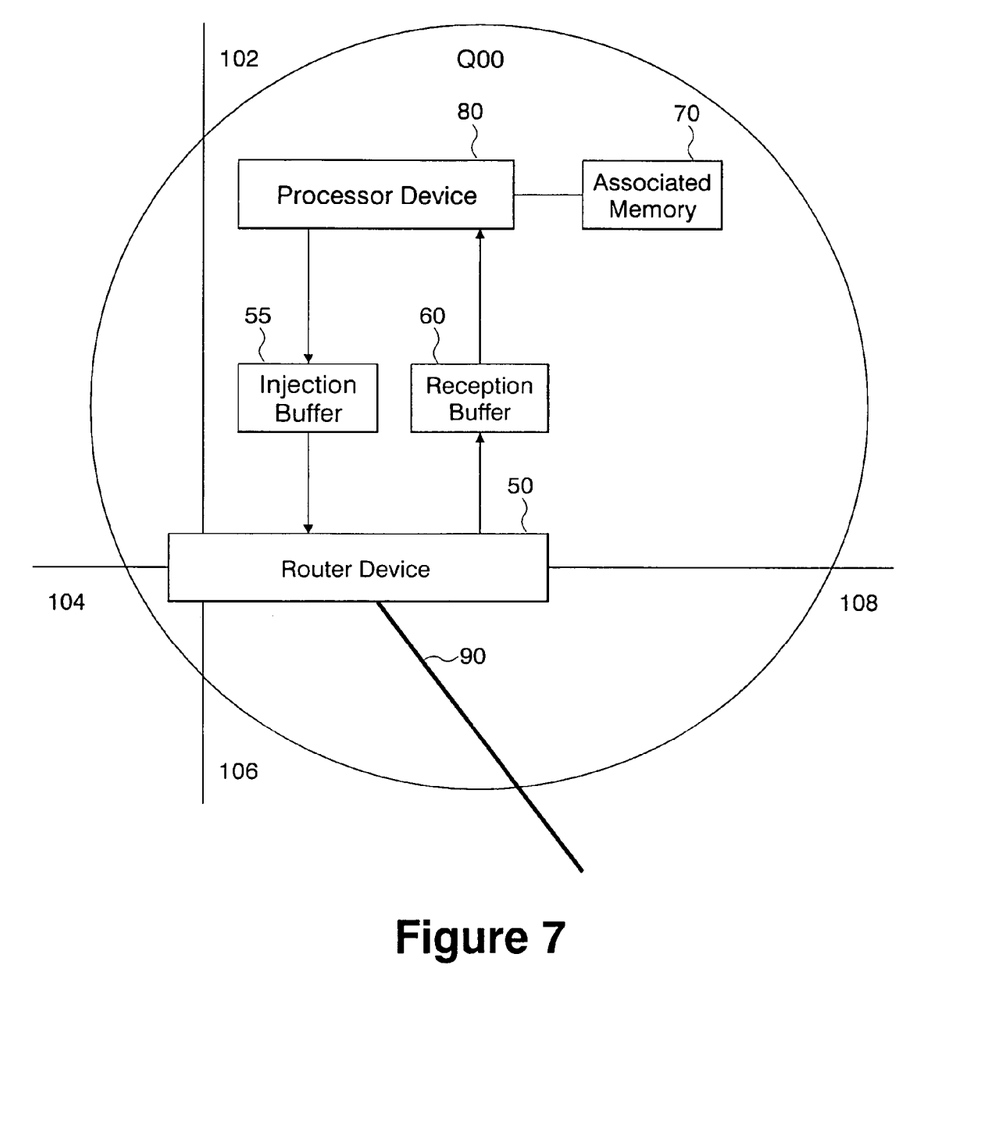
FIG. 7 illustrates in more detail an exemplary node Q00 of the nine nodes of the switch of FIG. 6.

FIG. 6 illustrates an exemplary implementation of an integrated switch element 100 shown having nine (9) nodes interconnected via a multidimensional grid comprising internal links 102, 104, . . . , 114, 116 configured as an internal 2-dimensional 3×3 Torus network according to the present invention. The bold lines shown in FIG. 6 are external links to other switches. The integrated switch of FIG. 6 includes nine (9) nodes labeled Q00, Q01, Q02, . . . , Q21, Q22, each node Q00, Q01, Q02, . . . , Q21, Q22 including a router. A detailed illustration of such a node is provided in FIG. 7 that illustrates in greater detail an exemplary node Q00 of the nine nodes of the switch of FIG. 6. As shown in FIG. 7, each node includes a router device 50, a processor device 80 and associated memory 70 that injects messages or data into the switch via an injection buffer 55 and receives data received at the node via a reception buffer 60. As shown in the exemplary embodiments depicted in FIGS. 6 and 7, each of the nine (9) routers in a switch has an external link 90 to one of the other switches. In a distributed-memory computer comprising ten (10) switch elements, the external links link each of the ten switches to every other switch.

The above example computer can demonstrate the comparison of the internal and external bandwidths. Most all-to-all messages across the computer require an all-to-all in the source switch and in the destination switch. Thus if each router has an external link, the internal all-to-all bandwidth between routers must be twice the bandwidth of the external link. In a 3*3 torus, the all-to-all bandwidth to each router is approximately twice the link bandwidth. So the internal and external links can have the same bandwidth. In a contrasting example, in an 8*8 torus, the all-to-all bandwidth to each router is approximately the link bandwidth. So efficient use of the external links requires that the internal links have twice the external bandwidth.

The above matching of bandwidths for internal and external links seems sufficient in other situations. For example, assume that one switch of the above-described distributed-memory computer comprising ten (10) switch elements (FIG. 6) is used by application 1 and the other 9 switches are used by application 9. In the worst case, application 9 fully uses the application 1 switch for bounce traffic. Such a bounce is essentially an all-to-all on the bounce switch. Since the above matching provides twice the all-to-all bandwidth required by the external links, application 1 is left with half the all-to-all bandwidth on its switch in the worst case.

Another exemplary implementation of an integrated switch is now described in the context of a distributed-memory computer comprising 128 switches. Each switch includes 512 routers connected as an 8*8*8 torus network. Each router is connected to one node. Each of the 512 routers in a switch has an external link to one of the other switches. Thus each of the 128 switches has 4 links to every other switch. In such a computer, the internal links are cheaper in cost compared to the external links. Each internal link is simply a trace on a board or multiple boards. In contrast, an external link involves a trace and a cable or optical fiber. In an all-to-all communication, a message passes over one external link and many internal links. In other communication patterns, a message passes over two links at most. Thus as required the one-bounce network makes efficient use of the external links.

Another exemplary implementation of an integrated switch is now described in the context of a distributed-memory computer comprising 10 switches. Each switch contains 9 routers connected as a two-dimensional switch network. Such a network is an example of the network described in commonly owned, co-pending U.S. patent application Ser. No. 10/793,068 entitled "Multi-dimensional Switch Network," the contents and disclosure of which is incorporated by reference as if fully set forth herein. In such a network, each dimension of the network is three (3) routers in length. Each router is connected to one node. Each of the nine (9) routers in a switch has an external link to one of the other switches. Thus each of the 10 switch elements is linked to every other switch.

A unicast packet may be routed on the bounce network and through its switches in the manner as now described. It is assumed for purposes of this example, that the routing is adaptive on the bounce network. This routing is achieved using two fields in the packet header. One field is the destination node identifier and is typical for many networks. The other field is the direct router identifier and is unique to the bounce network. Before injecting a packet into the network, the node writes the destination node identifier into the packet header. A node is identified by its switch and by its router within that switch. Using the destination switch as an index, the injection router looks up in a table the router on the injection switch with an external link to the destination switch. Such a router is a so-called direct router. If there is more than one direct router, then one direct router is chosen at random. The injection router writes the direct router identifier into the packet header. The direct router identifier is used within the injection switch to route the packet along the internal links to the direct router. As the packet passes through the injection switch, at each router encountered with one or more external links to other switches, the router randomly determines if the packet should be bounced to one of the other switches. The more busy the internal links towards the direct router, the more likely the packet is to be bounced. The less busy the external links towards the other routers, the more likely the packet is to be bounced. As described above, if the packet is bounced, the bounce bit is set. As described above for the injection router, the receiving bounce router uses the destination switch identifier as an index to look up in a table a direct router on the bounce switch with an external link to the destination switch. The receiving bounce router writes the direct router identifier into the packet header. The packet then passes along the internal links of the bounce switch to a direct router. Since the bounce bit is set, the packet is not bounced off the bounce switch. Similarly, if the packet didn't bounce on the injection switch, it reached a direct router on that switch. From direct router, the packet passes over an external link to a receiving router on the destination switch. In the packet header, the receiving router sets the bounce bit if it is not already set and copies the destination route identifier to direct router field. Obviously, if a node injects a packet destined for its own switch, then the injection router can act like receiving router on the destination switch described above.

Additionally, global operations may be performed over the bounce network by enabling the injection of multicast packets in addition to the performance of multi-node reduction operations.

Figure 8:
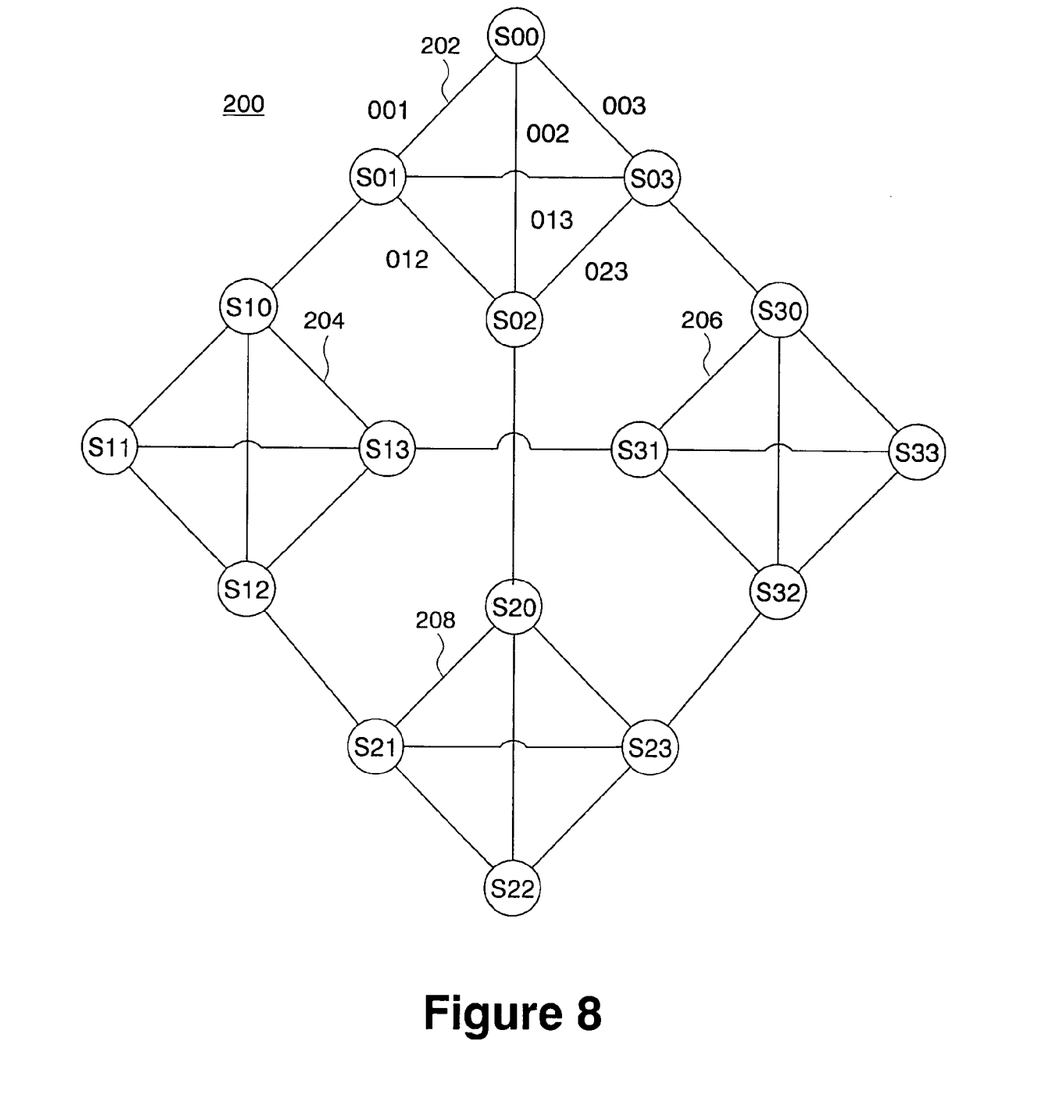
FIG. 8 illustrates an exemplary two-level, one-bounce network including a top-level having 4 switches interconnected via a link between each pair of switches according to the present invention.

As already described, the one bounce network consists of switches and allows for an arbitrary construction within each switch. Hence each switch may comprise a one bounce network. FIG. 8 illustrates an exemplary two-level one-bounce network 200 having a top-level including 4 switches 202-208 interconnected via a link between each pair of switches. Each switch within the top-level consists of 4 switches interconnected via a link between each pair of switches according to the present invention. Though not illustrated, at each level the number of switches is arbitrary and furthermore, even at the same level, the number of switches is arbitrary. As already described, a switch includes one or more routers, each router having links corresponding to none, one, many or all of the levels. For example in FIG. 8, if the lower level switches are taken to be routers, then some are linked only at the low level, while others are also linked at the high level.

An exemplary implementation of the two-level one-bounce network is now described in the context of a distributed-memory computer comprising cards with each card including 64 routers connected as a 4*4*4 torus network. Each router is connected to one node. A rack unit is defined as comprising 16 cards, the 16 cards in a rack being connected by the rack-level one-bounce network. Each card is connected by 4 rack-level links to each other card in its rack. Thus on each card, 15*4=60 of the 64 routers each have a rack-level link to another card in that rack. The distributed-memory computer may comprise 64 racks. The 64 racks in the machine are connected by the machine-level one-bounce network. Each rack is connected by 16 machine-level links to each other rack. Thus in each rack, 63*16=1008 of the 1024 routers each have a machine-level link to another rack.

Figure 9:
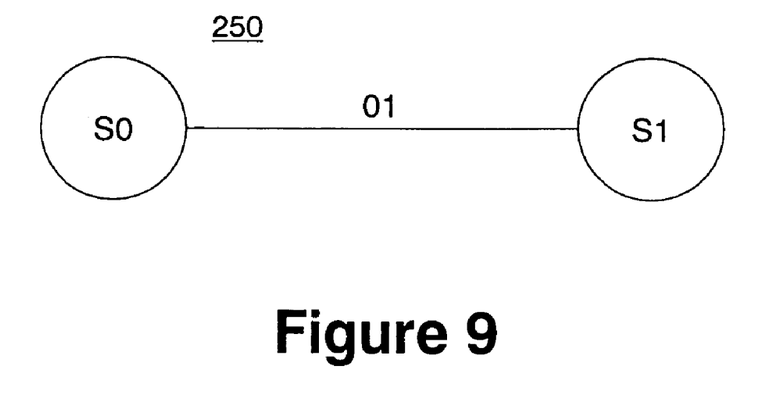
FIG. 9 illustrates an exemplary binary one-level one-bounce network comprising two routers linked to each other.
Figure 10:
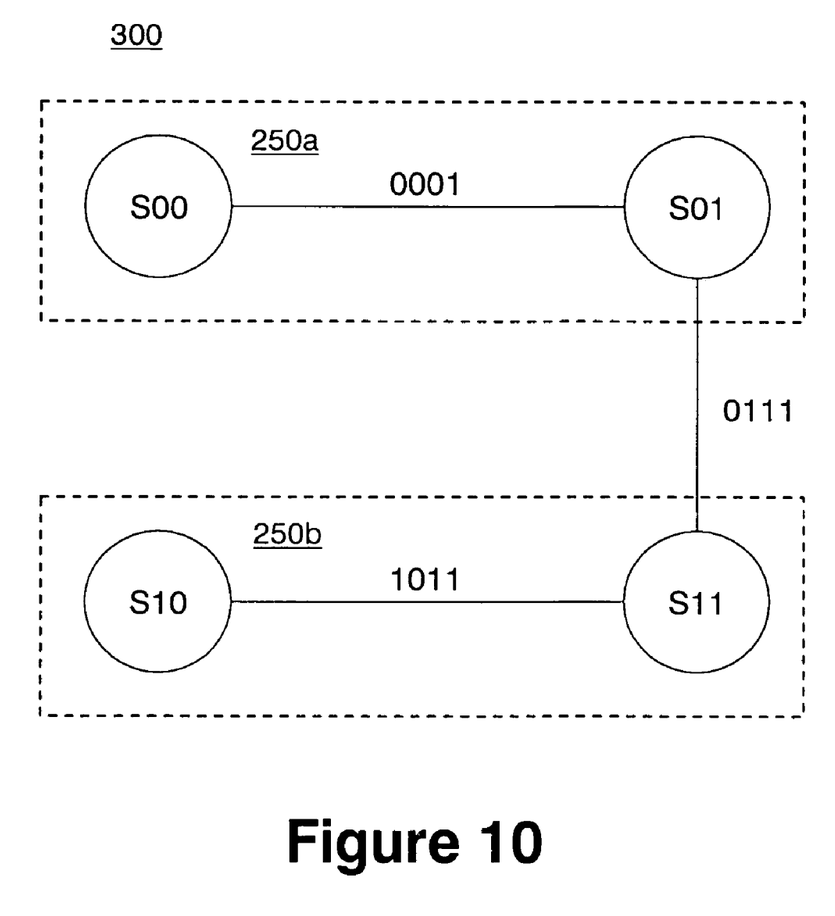
FIG. 10 illustrates an exemplary binary two-level, one-bounce network comprising two one-level networks linked to each other.
Figure 11:
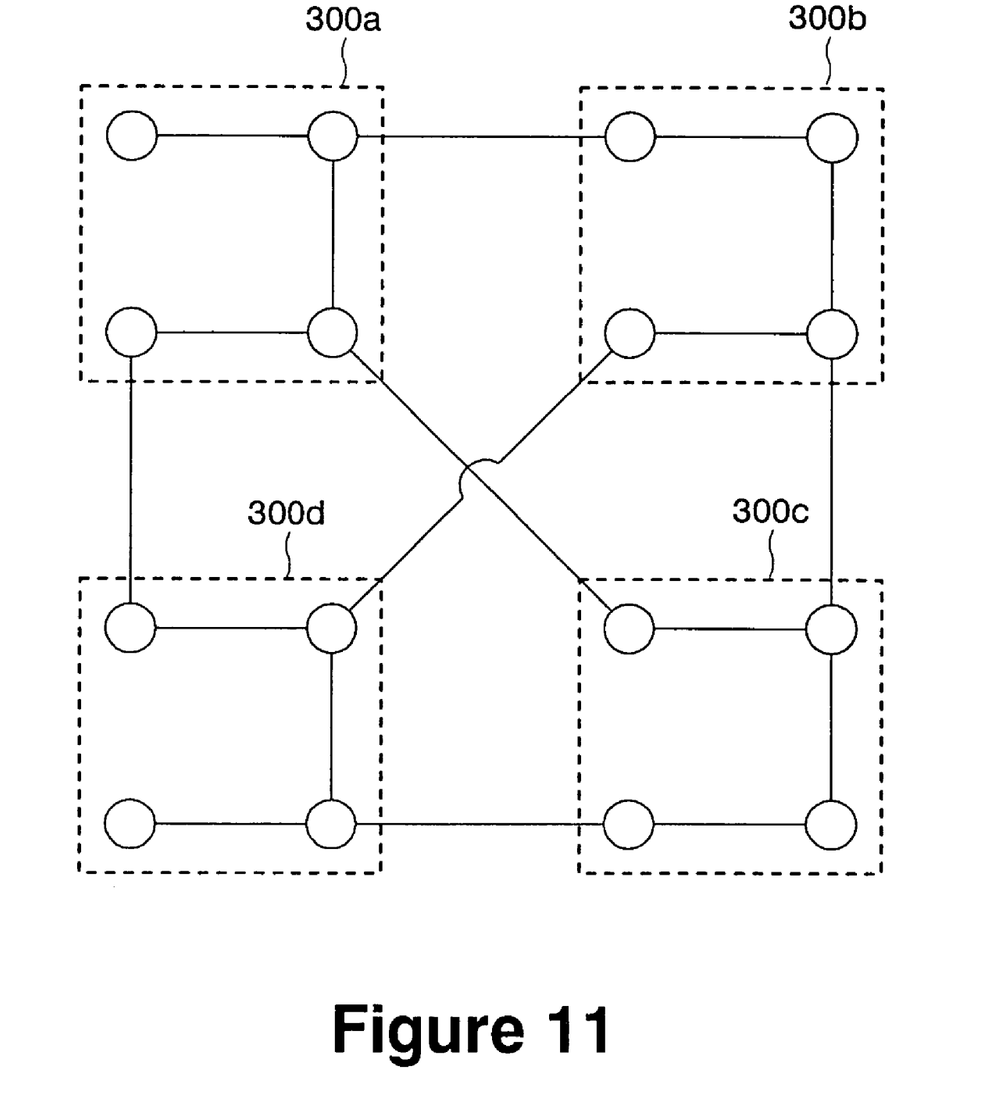
FIG. 11 illustrates an exemplary binary three-level, one-bounce network comprising four two-level networks linked to each other.

The two-level, one-bounce network may be generalized to a multi-level one-bounce network. An exemplary implementation is the binary one-bounce network. In this network, almost each router is linked on each level. FIG. 9 illustrates an exemplary binary one-level one-bounce network 250 comprising two routers labeled S0 and S1 linked to each other by link labeled link 01. FIG. 10 illustrates an example binary two-level one-bounce network 300 comprising two one-level networks 250*a*, 250*b* linked to each other via a link labeled link 0111 in FIG. 10. The network 300 thus includes four (4) routers. FIG. 11 illustrates an exemplary binary three-level one-bounce network 350 comprising four two-level networks 300*a*, 300*b*, 300*c* and 300*d* linked to each other. The network 350 thus includes 16 routers. Similarly, a binary four-level one-bounce network consists of sixteen three-level networks linked to each other and would comprise 256 routers. In summary, the L-level has the number L links at each router. The total number of routers is given by $2^x$ where $x=(2^{(L-1)})$. Effective use of the link bandwidth at a given level requires double the link bandwidth at the next lower level.

The binary one-bounce network can be compared to the existing hypercube network. Given L links at each router, the number of routers in a hypercube network is $2^L$. This is far fewer then the number of routers in the binary one-bounce network. The tradeoff is that the hypercube allows all links to have the same bandwidth, while the binary one-bounce network requires half the link bandwidth at each increasing level.

In the binary one-bounce network, not all links on all routers are used. These links could increase the connectivity of the binary one-bounce network.

Figure 12:
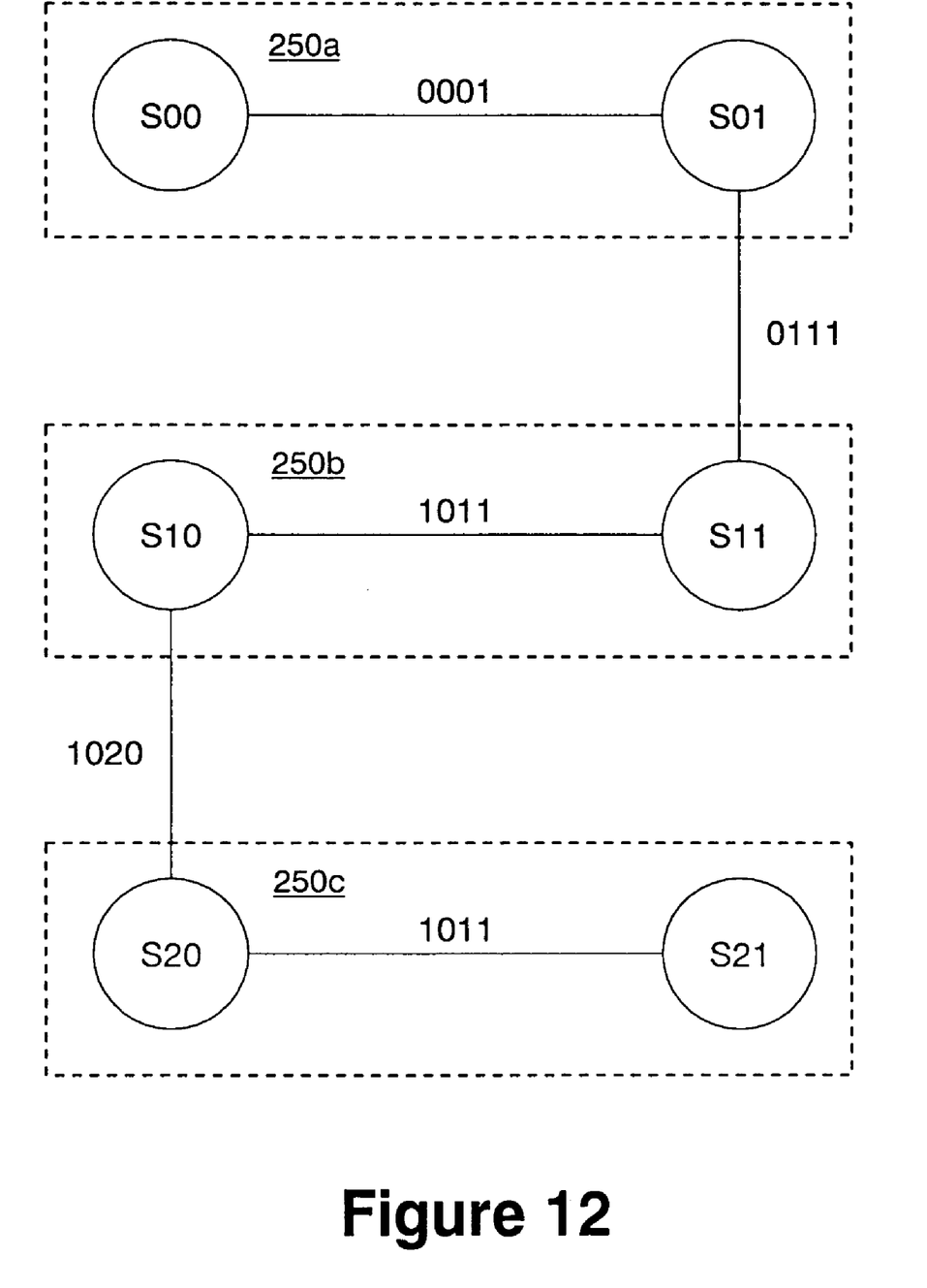
FIG. 12 illustrates an exemplary maximal two-level, one-bounce network comprising three one-level networks linked to each other.

All the links are also used in the maximal one-bounce network, a variation of the binary one-bounce network. The maximal one-level one-bounce network is the same as the binary one-level one-bounce network 250 depicted in FIG. 9. FIG. 12 illustrates an exemplary embodiment of a maximal two-level one-bounce network 400 comprising three one-level networks 250*a*, 250*b*, 250*c* linked to each other. The network 400 thus comprises six (6) routers. Similarly, a maximal three-level one-bounce network would comprise seven two-level networks linked to each other and having a total of 7*6=42 routers. Similarly, a maximal four-level one-bounce network comprises 43 three-level networks linked to each other and comprises 43*42=1806 routers. In summary, the L-level has the number L links at each router. The total number of routers increases much more rapidly than in the binary one-bounce network.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A one-bounce data network comprising a plurality of nodes interconnected to each other via communication links, the network including a plurality of interconnected switch devices, said switch devices interconnected such that a message is communicated between any two switches passes over a single link from a source switch to a destination switch: and, the source switch concurrently sends a message to a single arbitrary bounce switch configured for sending the message to the destination switch over a non-shortest path, said one-bounce network enabling simultaneous message communication between the source switch and destination switch up to the aggregate bandwidth of all the links to or from a switch, wherein the network is packet-based, a packet being communicated including means for indicating whether a packet has already bounced or not, the indicating means comprises a bounce bit in a packet header that is reset when the packet is injected into the network and is set when the packet is bounced to said single arbitrary bounce switch, a set bounce bit indicating that the packet can only go to the destination switch over said non-shortest path.

2. The one-bounce data network as claimed in claim 1, wherein all the switches in the network are paired and simultaneously communicate, such that each pair communicates at half the aggregate bandwidth of all the links from a switch, whereby at each switch of a pair, one-half of the bandwidth serves the bounce message of the other switch of said pair.

3. The one-bounce data network as claimed in claim 2, wherein the effective bandwidth from each switch increases from one-half aggregate up to all the aggregate bandwidth of all the links from the switch as a number of switches comprising a group increases in number, the largest group comprising all the switches of the network.

4. The one-bounce data network as claimed in claim 1, wherein the network is circuit-switched.

5. The one-bounce data network as claimed in claim 1, further including means for enabling a node to specify a particular bounce switch to be used for message communication, a node setting the bounce bit in the packet header and specifying a direct router identifier, wherein when the identified direct router is not the router of a destination node, the packet is bounced over an external link to the identified direct router.

6. The one-bounce data network as claimed in claim 1, wherein said bounce bit is set before injecting a packet into the network, such that said packet is guaranteed not to bounce, said packet injected for communication on an injection channel in an injection switch and delivered to the destination channel on the destination switch, a delivery being in order across the network.

7. The one-bounce data network as claimed in claim 1, wherein each switch includes thee independent channels for communicating message traffic internal to said switch free of deadlock, said independent channels being used in concert to provide a single deadlock-free channel across the switches rendering said network as deadlock free.

8. The one-bounce data network as claimed in claim 1, wherein a switch comprises one or more routers, internal links and external links, an internal link linking two routers within the switch and the external link linking two routers in two different switches wherein, for a switch, a router may have zero, one or more external links.

9. The one-bounce data network as claimed in claim 8, wherein within a given switch, the internal links may have differing bandwidths.

10. The one-bounce data network as claimed in claim 8, wherein within a given switch, the external links have different bandwidths.

11. The one-bounce data network as claimed in claim 8, wherein within a given switch, the external links have different bandwidths than those of the internal links, such different bandwidths matching the aggregate performance of the internal and external links.

12. The one-bounce data network as claimed in claim 8, wherein a switch is integrated such that an internal router serves the external links in addition also serving the nodes of the switch.

13. The one-bounce data network as claimed in claim 8, wherein a switch is a two-part switch having a first group of internal routers serving the external links and a second group of routers serving the nodes of the switch.

14. The one-bounce data network as claimed in claim 8, wherein said network is configured to perform all-to-all messaging, wherein each router has an external link, and is configured with internal links having twice the effective all-to-all bandwidth of the effective all-to-all bandwidth of the external links.

15. The one-bounce data network as claimed in claim 8, wherein switches of said plurality of interconnected switch devices of said network is internally a multi-dimensional torus network.

16. The one-bounce data network as claimed in claim 8, wherein switches of said plurality of interconnected switch devices of said network is internally a multi-dimensional switch network.

17. The one-bounce data network as claimed in claim 8, configured as one of: a single-level, two-level or multi-level bounce network.

18. The one-bounce data network as claimed in claim 8, further comprising means for injecting a unicast packet on the network and through a injection switch, said unicast packet including a first field in a packet header for specifying a destination node identifier and another field in said packet header for specifying a direct router, wherein a node writes said destination node identifier into the packet header before injecting a packet into the network at said injection switch, and said router implementing means for determining a direct router on the injection switch with an external link to the destination switch based on said destination node identifier specified.

19. The one-bounce data network as claimed in claim 18, wherein said direct router identifier is used within the injection switch to route a packet along internal links to said direct router having art external link to a destination switch, a packet possibly encountering other routers en route to said direct router, wherein an adaptive routing means at a router determines if a packet being routed should be bounced to another switch at each router encountered having one or more external links to other switches, and upon determining a packet is to be bounced, setting said bounce bit.

20. A distributed-memory computer configured as a two-level one-bounce network with a one-bounce network level comprising 64 one-bounce nodes with each one-bounce node having a link connecting to every other one-bounce node with each one-bounce node comprising: a plurality of cards, each card including 64 routers connected as a 4*4*4 torus network, with each router connected to a single node, said nodes of said one-bounce network level including a switch device, and said switch devices interconnected such that a message communicated between any two switches passes over a single link from a source switch to a destination switch; and, the source switch concurrently sends a message to a single arbitrary bounce switch configured for sending the message to the destination switch over a non-shortest path, wherein, the network is packet-based, a packet being communicated including means for indicating whether a packet has already bounced or not, the indicating means comprising a bounce bit in a packet header that is reset when the packet is injected into the network and is set when the packet is bounced to a single arbitrary bounce switch, a set bounce bit indicating that the packet can only go to the destination switch over said non-shortest path.

21. The distributed-memory computer as claimed in claim 20, wherein a rack unit comprises 16 cards, the 16 cards in a rack being connected as a rack-level one-bounce network with each card connected by 4 rack-level links to each other card in its rack.

22. The distributed-memory computer as claimed in claim 21, comprising 64 racks, the 64 racks in the machine being connected as a machine-level one-bounce network with each rack connected by 16 machine-level links to each other rack.

23. A distributed-memory computer configured as a multi-level binary one-bounce network comprising L levels, said network comprising a total number Of $2^x$ routers at each level wherein $x=2^{(L-1)}$, a L-level of said network having L links at each router, wherein a given level includes double the link bandwidth compared to bandwidth at a next lower level, said one-bounce network level comprising a plurality of nodes interconnected to each other via communication links, the network including a plurality of interconnected switch devices, said switch devices interconnected such that a message is communicated between any two switches passes over a single link from a source switch to a destination switch; and, the source switch concurrently sends a message to a single arbitrary bounce switch configured for sending the message to the destination switch over a non-shortest path, wherein, the network is packet-based, a packet being communicated including means for indicating whether a packet has already bounced or not, the indicating means comprising a bounce bit in a packet header that is reset when the packet is injected into the network and is set when the packet is bounced to a single arbitrary bounce switch, a set bounce bit indicating that the packet can only go to the destination switch over said non-shortest path.

24. A method of passing messages over a one-bounce network comprising a plurality of nodes interconnected to each other via communication links, the network including a plurality of interconnected switch devices, said switch devices interconnected such that a message communicated between any two switches passes over a single link from a source switch to a destination switch said method comprising the steps of:

concurrently communicating a message from said source switch to a single arbitrary bounce switch configured for sending messages to the destination switch, and communicating the message from the arbitrary bounce switch to the destination switch over a non-shortest path, wherein said one-bounce network enables simultaneous messages to be communicated between the source switch and destination switch up to the aggregate bandwidth of all the links to or from a switch, wherein the network is packet-based, said method including injecting a packet into a network switch and indicating whether a packet has bounced or not, the step of indicating comprises resetting a bounce bit in a packet header when the packet is injected into the network and setting the bounce bit when the packet is bounced to said single arbitrary bounce switch, a set bounce bit indicating that the packet can only go to the destination switch over said non-shortest path.

25. The method as claimed in claim 24, including the step of configuring switches in said network as pairs, such that each pair communicates at half the aggregate bandwidth of all the links from a switch, whereby at each switch of a pair, one-half of the bandwidth serves the bounce message of the other switch of said pair.

26. The method as claimed in claim 25, further including the step of increasing the number of switches comprising a group such that the effective bandwidth from each switch increases from one-half aggregate up to all the aggregate bandwidth of all the links from the switch, a largest group comprising all the switches of the network.

27. The method as claimed in claim 24, further including the step of: enabling a node to specify a particular bounce switch to be used for message communication, a node setting the bounce bit in the packet header and specifying a direct router identifier, wherein when the identified direct router is not the router of a destination node, the packet is bounced over an external link to the identified direct router.

28. The method as claimed in claim 24, wherein each switch includes three independent channels for communicating message traffic internal to said switch free of deadlock, said method including implementing said channels to provide a single deadlock-free channel across the switches rendering said network as deadlock free.

29. The method as claimed in claim 24, further including the step of: setting said bounce bit before injecting a packet into the network, such that said packet is guaranteed not to bounce, said packet injected for communication on an injection channel in an injection switch and delivered to the destination channel on the destination switch, a delivery being in order across the network.

30. The method as claimed in claim 24, wherein a switch comprises one or more routers, internal links and external links, an internal link linking two routers within the switch and the external link linking two routers in two different switches wherein, for a switch, a router may have zero, one or more external links.

31. The method as claimed in claim 30, wherein within a given switch, one of: the internal links have differing bandwidths, the external links have different bandwidths or, the external links have different bandwidths than those of the internal links, such different bandwidths matching the aggregate performance of the internal and external links.

32. The method as claimed in claim 30, further comprising the steps of injecting a unicast packet on the network and through a injection switch, said unicast packet including a first field in a packet header for specifying a destination node identifier and another field in said packet header for specifying a direct router, wherein a node writes said destination node identifier into the packet header before injecting a packet into the network at said injection switch, and said router implementing means for determining a direct router on the injection switch with an external link to the destination switch based on said destination node specified.

33. The method as claimed in claim 32, further including routing a packet along internal links to said direct router having an external link to a destination switch according to said direct router identifier, a packet possibly encountering other routers en route to said direct router, said method further including determining at an encountered router if a packet being routed should be bounced to another switch having one or more external links to other switches, and upon determining a packet is to be bounced, setting said bounce bit.

34. The method as claimed in claim 30, wherein a switch is integrated such that an internal router serves the external links in addition also serving the nodes of the switch.

35. The method as claimed in claim 30, wherein a switch is a two-part switch having a first group of internal routers serving the external links and a second group of routers serving the nodes of the switch.

36. The method as claimed in claim 30, comprising the step of: configuring said network to perform all-to-all messaging, wherein each router has an external link, and is configured with internal links having twice the bandwidth of the external link.

37. The method as claimed in claim 30, wherein internal switches of said network is one of a multi-dimensional torus network or, a multi-dimensional switch network.

* * * * *